(12) United States Patent  
Spreitzer et al.

(10) Patent No.: US 11,581,019 B2
(45) Date of Patent: Feb. 14, 2023

(54) AUTOMATED VIDEO EDITING

(71) Applicant: Snap Inc., Santa Monica, CA (US)

(72) Inventors: Kenneth Jay Spreitzer, San Francisco, CA (US); Haoyun Wu, Rancho Palos Verdes, CA (US)

(73) Assignee: Snap Inc., Santa Monica, CA (US)

( * ) Notice: Subject to any disclaimer, the term of this patent is extended or adjusted under 35 U.S.C. 154(b) by 0 days.

(21) Appl. No.: 17/479,096

(22) Filed: Sep. 20, 2021

(65) Prior Publication Data

US 2022/0293133 A1    Sep. 15, 2022

Related U.S. Application Data

(60) Provisional application No. 63/200,539, filed on Mar. 12, 2021.

(51) Int. Cl.
*G11B 27/031* (2006.01)
*G06T 7/20* (2017.01)
*G06V 20/40* (2022.01)

(52) U.S. Cl.
CPC .............. *G11B 27/031* (2013.01); *G06T 7/20* (2013.01); *G06V 20/40* (2022.01); *G06T 2207/10016* (2013.01)

(58) Field of Classification Search
CPC .......... G11B 27/031; G06V 20/40; G06T 7/20
See application file for complete search history.

(56) References Cited

U.S. PATENT DOCUMENTS

| | | |
|---|---|---|
| 2003/0160944 A1 | 8/2003 | Foote et al. |
| 2008/0016114 A1 | 1/2008 | Beauregard et al. |
| 2008/0092168 A1 | 4/2008 | Logan et al. |
| 2010/0183280 A1 | 7/2010 | Beauregard et al. |
| 2011/0268426 A1* | 11/2011 | Kikuchi ................. G11B 27/28 386/278 |
| 2013/0077937 A1 | 3/2013 | Kennedy et al. |
| 2014/0245367 A1 | 8/2014 | Sasaki et al. |
| 2014/0328570 A1* | 11/2014 | Cheng ................... H04N 21/233 386/241 |
| 2018/0154232 A1 | 6/2018 | Gentil |
| 2019/0392866 A1 | 12/2019 | Yoon et al. |

(Continued)

FOREIGN PATENT DOCUMENTS

| | | |
|---|---|---|
| KR | 20210022279 A | 3/2021 |
| WO | WO-2021020160 A1 | 2/2021 |

OTHER PUBLICATIONS

"International Application Serial No. PCT/US2022/071052, International Search Report dated Jun. 10, 2022", 5 pgs.

(Continued)

*Primary Examiner* — Mishawn N. Hunter
(74) *Attorney, Agent, or Firm* — Schwegman Lundberg & Woessner, P.A.

(57) ABSTRACT

A method of generating a modified video file using one or more processors is disclosed. The method comprises detecting objects that are represented in an original video file using computer vision object-detection techniques, determining object motion characteristics for the detected objects, based on a specific object motion characteristic for a specific detected object meeting certain requirements, selecting a corresponding audio or visual effect, and applying the corresponding visual effect to the original video file to create the modified video file.

20 Claims, 8 Drawing Sheets

(56) References Cited

U.S. PATENT DOCUMENTS

2020/0099868 A1    3/2020  Barthwal et al.
2020/0364462 A1*  11/2020  Imes .................. H04N 5/23219
2020/0366395 A1   11/2020  Brenner et al.

OTHER PUBLICATIONS

"International Application Serial No. PCT/US2022/071052, Written Opinion dated Jun. 10, 2022", 8 pgs.

* cited by examiner

AUTOMATED VIDEO EDITING

CLAIM OF PRIORITY

This application claims the benefit of U.S. Provisional Patent Application No. 63/200,539, filed Mar. 12, 2021, the contents of which are incorporated herein by reference as if explicitly set forth.

BACKGROUND

Social networking applications provide a vehicle for the sharing of user content such as photos or videos. In some instances, the photos or videos may be supplemented by augmented reality or other effects that are generated live on a camera feed and displayed on the display of a mobile device for preview. The user may be able to select and manipulate effects to apply to the live camera feed, and when satisfied capture an image or record a video including the effects. The captured video or photo can then be shared on the social networking platform.

Photos can easily be edited after capture, but it may be desirable to provide additional options for enhancing or editing captured or stored videos.

BRIEF DESCRIPTION OF THE DRAWINGS

In the drawings, which are not necessarily drawn to scale, like numerals may describe similar components in different views. To easily identify the discussion of any particular element or act, the most significant digit or digits in a reference number refer to the figure number in which that element is first introduced. Some nonlimiting examples are illustrated in the figures of the accompanying drawings in which.

DETAILED DESCRIPTION

Figure 1:
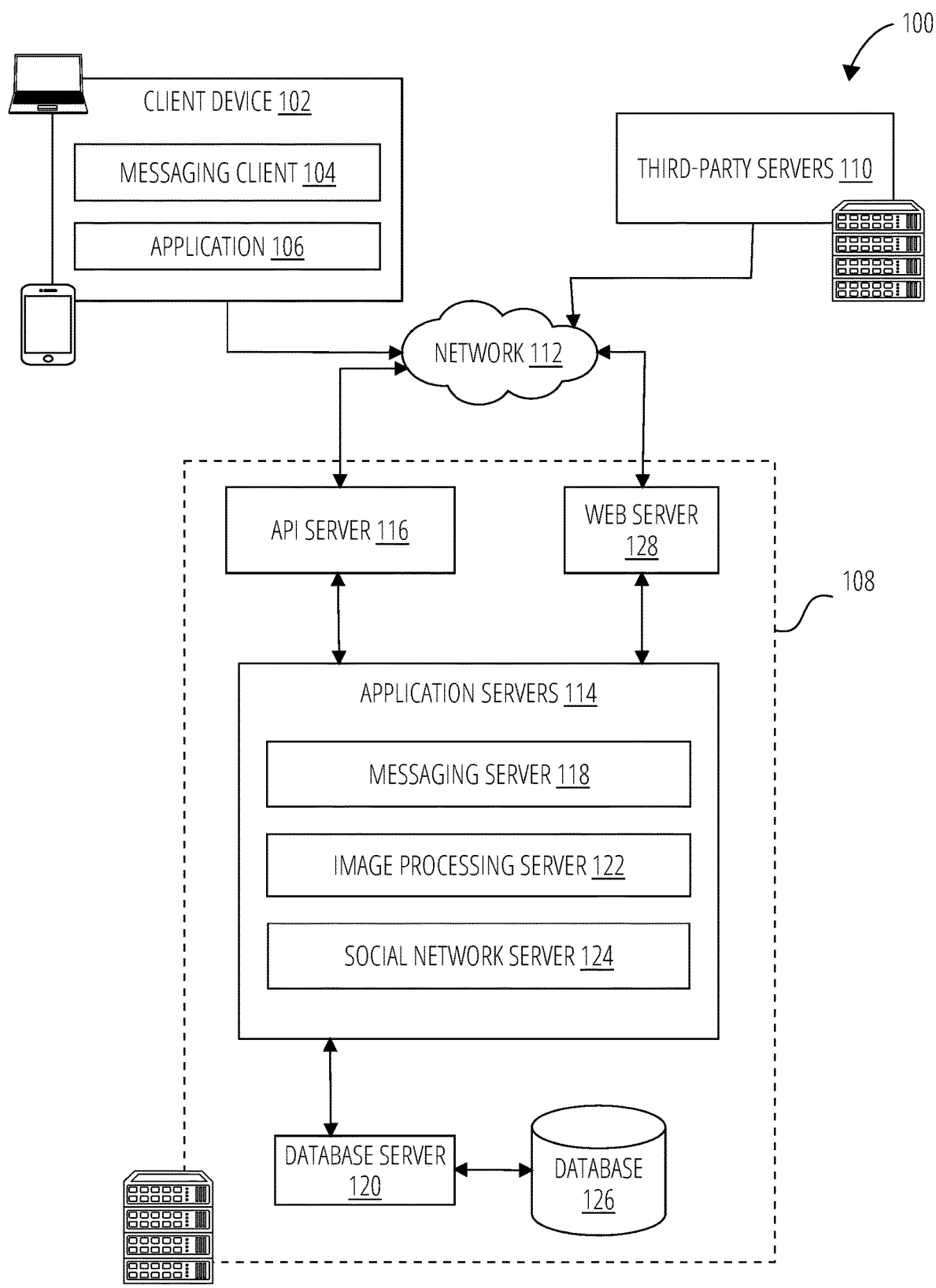
FIG. 1 is a diagrammatic representation of a networked environment in which the present disclosure may be deployed, in accordance with some examples.

Disclosed are systems and methods for providing automated video analysis and editing. In one example, a video is analyzed using computer vision object-detection techniques to identify objects represented in the video. Motion characteristics are determined for one or more of the identified objects. Based on the type or nature of the motion, the video can be edited to include additional visual or auditory effects. In some examples, sound effects can be paired with detected events in the video, such as collisions between objects or repetitive motion of objects represented in the video file. In other examples, the playback speed of the video can be altered. A frequency of motion of a detected object can also be used to add an audio track having a related number of beats per minute to the video, so that the motion of the detected object is synchronized with the beat of the audio track.

In one example, provided is a method, executed by one or more processors, for generating a modified video file for presentation on a device including a display. The example method includes detecting objects represented in an original video file using computer vision object-detection techniques, determining object motion characteristics for the detected objects, selecting a corresponding audio or visual effect based on a specific object motion characteristic for a specific detected object meeting a predetermined requirement, and applying the corresponding audio or visual effect to the original video file to create the modified video file.

In another example, provided is a non-transitory computer-readable storage medium, the computer-readable storage medium including instructions that when executed by a computer, cause the computer to perform operations to generate a modified video file. The operations may include detecting objects represented in an original video file using computer vision object-detection techniques, determining object motion characteristics for the detected objects, based on a specific object motion characteristic for a specific detected object meeting a predetermined requirement, selecting a corresponding audio or visual effect, and applying the corresponding audio or visual effect to the original video file to create the modified video file.

In a further example, provided is a computing apparatus including a processor, memory storing instructions that, when executed by the processor, configure the apparatus to generate a modified video file by detecting objects represented in an original video file using computer vision object-detection techniques, determining object motion characteristics for the detected objects, based on a specific object motion characteristic for a specific detected object meeting a predetermined requirement, selecting a corresponding audio or visual effect, and applying the corresponding audio or visual effect to the original video file to create the modified video file.

The predetermined requirement for the specific object motion characteristic may be a change in direction of the specific detected object, repeating motion of the specific detected object or a collision of the specific detected object with another object. In one example, the corresponding audio or visual effect is a sound effect applied to correspond to the change in direction of the specific detected object. The corresponding audio or visual effect may also be a sound effect that is applied repetitively at a frequency of motion of the specific detected object. The corresponding audio or visual effect may also be an adjustment of a playback speed of the original video file adjacent to the collision.

The corresponding audio or visual effect may be an audio track that has a characteristic frequency that is substantially a multiple or fractional value of a frequency of motion of the specific detected object. The playback speed of the original video file or the audio track may also be adjusted to match the frequency of motion of the specific detected object to the characteristic frequency.

FIG. 1 is a block diagram showing an example messaging system 100 for exchanging data (e.g., messages, media and associated content) over a network. The messaging system 100 includes multiple instances of a client device 102, each of which hosts a number of applications, including a messaging client 104 and other applications 106. Each messaging client 104 is communicatively coupled to other instances of the messaging client 104 (e.g., hosted on respective other client devices 102), a messaging server system 108 and third-party servers 110 via a network 112 (e.g., the Internet). A messaging client 104 can also communicate with locally-hosted applications 106 using Application Program Interfaces (APIs).

A messaging client 104 is able to communicate and exchange data with other messaging clients 104 and with the messaging server system 108 via the network 112. The data exchanged between messaging clients 104, and between a messaging client 104 and the messaging server system 108, includes functions (e.g., commands to invoke functions) as well as payload data (e.g., text, audio, video or other multimedia data).

The messaging server system 108 provides server-side functionality via the network 112 to a particular messaging client 104. While certain functions of the messaging system 100 are described herein as being performed by either a messaging client 104 or by the messaging server system 108, the location of certain functionality either within the messaging client 104 or the messaging server system 108 may be a design choice. For example, it may be technically preferable to initially deploy certain technology and functionality within the messaging server system 108 but to later migrate this technology and functionality to the messaging client 104 where a client device 102 has sufficient processing capacity.

The messaging server system 108 supports various services and operations that are provided to the messaging client 104. Such operations include transmitting data to, receiving data from, and processing data generated by the messaging client 104. This data may include message content, client device information, geolocation information, media augmentation and overlays, message content persistence conditions, social network information, and live event information, as examples. Data exchanges within the messaging system 100 are invoked and controlled through functions available via user interfaces (UIs) of the messaging client 104.

Turning now specifically to the messaging server system 108, an Application Program Interface (API) server 116 is coupled to, and provides a programmatic interface to, application servers 114. The application servers 114 are communicatively coupled to a database server 120, which facilitates access to a database 126 that stores data associated with messages processed by the application servers 114. Similarly, a web server 128 is coupled to the application servers 114, and provides web-based interfaces to the application servers 114. To this end, the web server 128 processes incoming network requests over the Hypertext Transfer Protocol (HTTP) and several other related protocols.

The Application Program Interface (API) server 116 receives and transmits message data (e.g., commands and message payloads) between the client device 102 and the application servers 114. Specifically, the Application Program Interface (API) server 116 provides a set of interfaces (e.g., routines and protocols) that can be called or queried by the messaging client 104 in order to invoke functionality of the application servers 114. The Application Program Interface (API) server 116 exposes various functions supported by the application servers 114, including account registration, login functionality, the sending of messages, via the application servers 114, from a particular messaging client 104 to another messaging client 104, the sending of media files (e.g., images or video) from a messaging client 104 to a messaging server 118, and for possible access by another messaging client 104, the settings of a collection of media data (e.g., story), the retrieval of a list of friends of a user of a client device 102, the retrieval of such collections, the retrieval of messages and content, the addition and deletion of entities (e.g., friends) to an entity graph (e.g., a social graph), the location of friends within a social graph, and opening an application event (e.g., relating to the messaging client 104).

The application servers 114 host a number of server applications and subsystems, including for example a messaging server 118, an image processing server 122, and a social network server 124. The messaging server 118 implements a number of message processing technologies and functions, particularly related to the aggregation and other processing of content (e.g., textual and multimedia content) included in messages received from multiple instances of the messaging client 104. The text and media content from multiple sources may be aggregated into collections of content (e.g., called stories or galleries). These collections are then made available to the messaging client 104. Other processor and memory intensive processing of data may also be performed server-side by the messaging server 118, in view of the hardware requirements for such processing.

The application servers 114 also include an image processing server 122 that is dedicated to performing various image processing operations, typically with respect to images or video within the payload of a message sent from or received at the messaging server 118.

The social network server 124 supports various social networking functions and services and makes these functions and services available to the messaging server 118. To this end, the social network server 124 maintains and accesses an entity graph within the database 126. Examples of functions and services supported by the social network server 124 include the identification of other users of the messaging system 100 with which a particular user has relationships or is "following," and also the identification of other entities and interests of a particular user.

Figure 2:
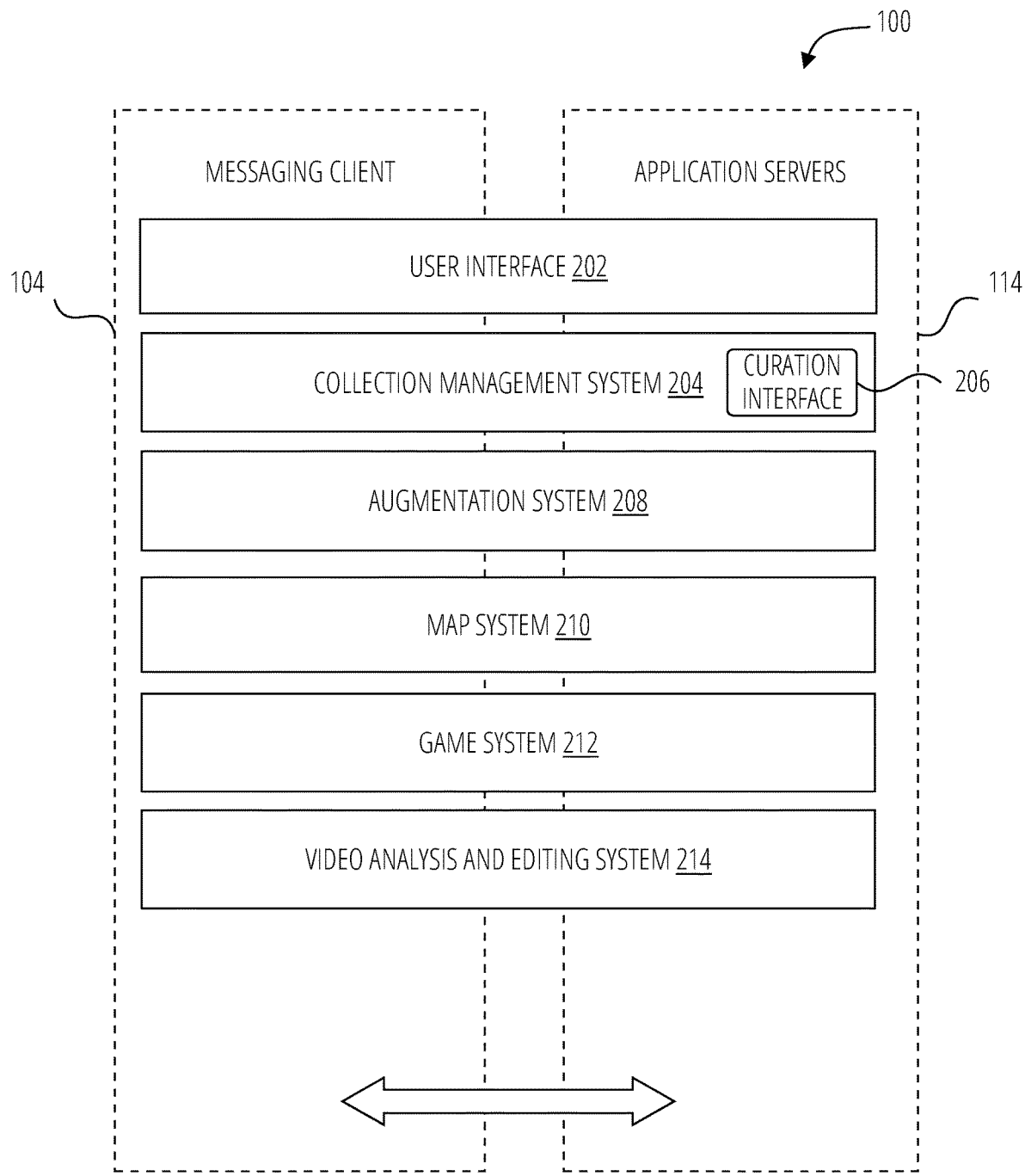
FIG. 2 is a diagrammatic representation of a messaging system, in accordance with some examples, that has both client-side and server-side functionality.

FIG. 2 is a block diagram illustrating further details regarding the messaging system 100, according to some examples. Specifically, the messaging system 100 is shown to comprise the messaging client 104 and the application servers 114. The messaging system 100 embodies a number of subsystems, which are supported on the client side by the messaging client 104 and on the sever-side by the application servers 114. These subsystems include, for example, a user interface 202, a collection management system 204, an augmentation system 208, a map system 210, a game system 212, and a video analysis and editing system 214.

The user interface 202 is responsible for providing output to and receiving input from a user of the messaging client 104 on the client device 102. The user interface provides a user-manipulatable display output on a display (see further user output components 726 in FIG. 7 and as described below) of the client device 102 as is known in the art. In one example, the user interface comprises a chat interface whereby a user can send and receive messages and associated content from one or more remote users. The user interface 202 also permits a user to manipulate live or captured media, for example by providing augmented reality effects on captured photos or videos, or on a live feed from a camera of the user device.

The collection management system 204 is responsible for managing sets or collections of media (e.g., collections of text, image video, and audio data). A collection of content (e.g., messages, including images, video, text, and audio) may be organized into an "event gallery" or an "event story." Such a collection may be made available for a specified time period, such as the duration of an event to which the content relates. For example, content relating to a music concert may be made available as a "story" for the duration of that music concert. The collection management system 204 may also be responsible for publishing an icon that provides notification of the existence of a particular collection to the user interface of the messaging client 104.

The collection management system 204 furthermore includes a curation interface 206 that allows a collection manager to manage and curate a particular collection of content. For example, the curation interface 206 enables an event organizer to curate a collection of content relating to a specific event (e.g., delete inappropriate content or redundant messages). Additionally, the collection management system 204 employs machine vision (or image recognition technology) and content rules to automatically curate a content collection. In certain examples, compensation may be paid to a user for the inclusion of user-generated content into a collection. In such cases, the collection management system 204 operates to automatically make payments to such users for the use of their content.

The augmentation system 208 provides various functions that enable a user to augment (e.g., annotate or otherwise modify or edit) media content associated with a message. For example, the augmentation system 208 provides functions related to the generation and publishing of media overlays for messages processed by the messaging system 100. The augmentation system 208 operatively supplies a media overlay or augmentation (e.g., an image filter) to the messaging client 104 based on a geolocation of the client device 102. In another example, the augmentation system 208 operatively supplies a media overlay to the messaging client 104 based on other information, such as social network information of the user of the client device 102. A media overlay may include audio and visual content and visual effects. Examples of audio and visual content include pictures, texts, logos, animations, and sound effects. An example of a visual effect includes color overlaying. The audio and visual content or the visual effects can be applied to a media content item (e.g., a photo) at the client device 102. For example, the media overlay may include text or image that can be overlaid on top of a photograph taken by the client device 102. In another example, the media overlay includes an identification of a location overlay (e.g., Venice beach), a name of a live event, or a name of a merchant overlay (e.g., Beach Coffee House). In another example, the augmentation system 208 uses the geolocation of the client device 102 to identify a media overlay that includes the name of a merchant at the geolocation of the client device 102. The media overlay may include other indicia associated with the merchant. The media overlays may be stored in the database 126 and accessed through the database server 120.

The map system 210 provides various geographic location functions, and supports the presentation of map-based media content and messages by the messaging client 104. For example, the map system 210 enables the display of user icons or avatars on a map to indicate a current or past location of "friends" of a user, as well as media content (e.g., collections of messages including photographs and videos) generated by such friends, within the context of a map. For example, a message posted by a user to the messaging system 100 from a specific geographic location may be displayed within the context of a map at that particular location to "friends" of a specific user on a map interface of the messaging client 104. A user can furthermore share his or her location and status information (e.g., using an appropriate status avatar) with other users of the messaging system 100 via the messaging client 104, with this location and status information being similarly displayed within the context of a map interface of the messaging client 104 to selected users.

The game system 212 provides various gaming functions within the context of the messaging client 104. The messaging client 104 provides a game interface providing a list of available games that can be launched by a user within the context of the messaging client 104, and played with other users of the messaging system 100. The messaging system 100 further enables a particular user to invite other users to participate in the play of a specific game, by issuing invitations to such other users from the messaging client 104. The messaging client 104 also supports both the voice and text messaging (e.g., chats) within the context of gameplay, provides a leaderboard for the games, and also supports the provision of in-game rewards (e.g., coins and items).

The video analysis and editing system 214 implements the methods described in more detail below. In particular, the video analysis and editing system 214 analyzes one or more videos to identify objects or characteristics or events that may be paired with visual effects, sounds, sound effects, music or other audio from a library of same. The object may be any identifiable object in a video and the characteristics may for example be a repetitive motion by such an object or repetitive motion that is otherwise apparent from the video, or a sudden change in motion that may be paired with a sound effect. In the case of repetitive motion, a music track or excerpt may overwrite or be added to the existing audio accompanying the video such that the beat of the audio track is synchronized with the repetitive motion or frequency characteristic of the video. It will of course be appreciated that references to "objects in a video" refer to representations of objects in the video and not objects as such.

The music track may be selected based on the beats per minute of the audio track substantially matching the repetitive motion in the video by an integer value or a fraction thereof, or by another characteristic determined from or accompanying the audio track, such as in metadata accompanying the audio track. Additionally, the playback speed of the audio or of the video may be adjusted to provide an integer or fractional match between the audio track and the video. In this context, it may be unlikely that an exact frequency match will be found between an audio track and repetitive motion and substantially in this regard is understood to mean a frequency match that will still allow the audio and video to be satisfactorily matched, either with or without adjusting the playback speed of either or both of the audio or video.

The video playback speed may be also be adjusted temporarily based on the contents of the audio track, in addition to or instead of matching the beats of the audio track to repetitive motion. For example, if a song has a section with a heavy horn blast every few seconds, the video could be stopped (i.e. a "freeze frame"), sped up or slowed down at each horn blast and then could resume playing at the previous/default speed until the next horn blast, at which point another freeze-frame would be shown. Repetitive sounds other than drumbeats could be identified by appropriate filtering of the audio track.

The video analysis and editing system 214 may initiate scanning of available videos, either stored locally on the client device 102 or remotely in the messaging server system 108 or on a third-party server 110. The scanning may be initiated based on the detection of a new video that has been captured or stored by a user of the client device 102, or based on the user initiating the scanning of one or more videos in an existing collection. Additionally, scanning of videos may be initiated from the messaging server system 108 or the messaging client 104, based on new features being provided, new sound effects being available, or for any other reason. The video analysis and editing system 214 will typically create a new version of any video that it edits, so that the original version is not overwritten.

Upon completion of editing by the video analysis and editing system 214, a notification is provided to a user by the user interface 202 of the messaging client 104 in one example. The notification indicates that a newly edited video is available, and prompt either viewing of the video or dismissal of the notification. In one example, dismissal may provide the option of deleting the edited video. Alternatively, the edited video may automatically be deleted if the notification is dismissed. Upon viewing the video, user interface controls may be provided to permit saving, forwarding, posting and so forth, of the video.

Object detection and tracking is performed by the video analysis and editing system 214 using current or yet to be developed computer vision techniques. Motion characteristics of the detected objects may then be extracted, which may in turn be analyzed to detect secondary characteristics or events that may be paired with audio in operation of the system.

Figure 3A:
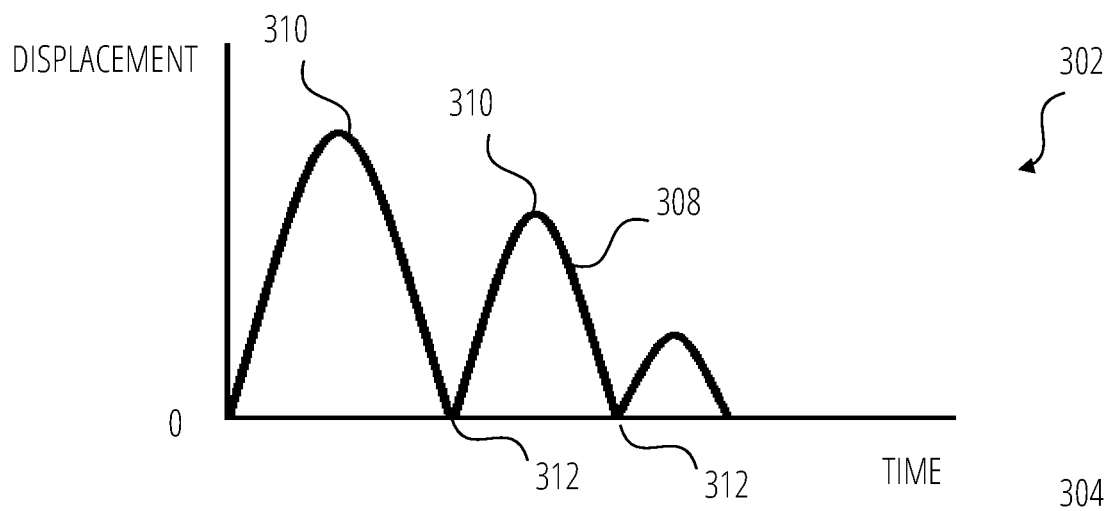
FIG. 3A is an example of a graph of displacement versus time for a bouncing ball.

FIG. 3A is an example of a graph 302 of displacement versus time for a bouncing ball, with displacement shown on the y axis and time shown on the x axis. In one example, this graph (or a corresponding signal) is determined or generated from a video under analysis by identifying a ball that is represented in the video using computer vision object-detection techniques and determining a vertical position of the ball in subsequent frames of the video using computer vision object tracking techniques. The time is a time or timestamp associated with the video under consideration. As can be seen from the figure, a plot 308 of the displacement versus time for the bouncing ball rises to peaks 310 between bounces 312. This plot 308 can be analyzed using known digital signal processing techniques to extract a characteristic period or frequency, representing the time between bounces or frequency of bounces respectively.

Additionally, the change of direction associated with a bounce 312 or a peak 310, can be determined from a change in the sign of a differential between the displacement in adjacent or nearby frames. The changes of direction can be used to identify events that might be paired with a sound effect or a soundtrack.

Figure 3B:
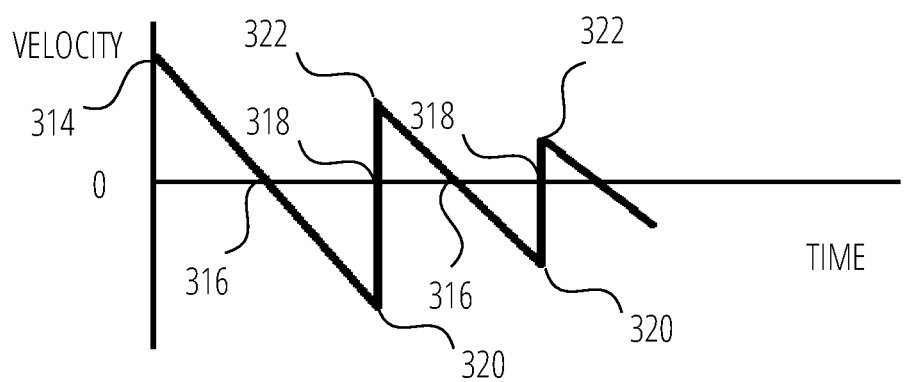
FIG. 3B is an example of a graph of velocity versus time for a bouncing ball.

FIG. 3B is an example of a graph 304 of the velocity versus time corresponding to the graph of FIG. 3A. As can be seen, the velocity of the ball goes from a maximum velocity 314 as it leaves the ground, with zero velocity at the zero crossings 316 corresponding to the peaks 310, to consecutive maximum negative velocities 320 just before the ball strikes the ground. Upon striking the ground at velocity 320 corresponding to bounce 312, the velocity of the ball changes rapidly from negative to positive to a new velocity peak 322, and so forth.

The plot shown in FIG. 3B can be analyzed by the video analysis and editing system 214 using known or future digital signal processing techniques for extracting a characteristic period or frequency, representing the time between bounces or frequency of bounces respectively.

Additionally, the velocity zero crossings 316 and zero crossings 318 associated with a bounce 312 or a peak 310, can be used by the video analysis and editing system 214 to detect a change in motion or an event that might be paired with a sound effect or a soundtrack. The rate at which zero crossings 316 and zero crossings 318 occur can also be used to distinguish between a change in direction that occurs relatively gradually, such as at peaks 310, versus a change in direction that occurs relatively rapidly, such as at bounces 312. An appropriate sound effect is then selected by the video analysis and editing system 214 based on the rapidity of the change. For example, a whistling sound that increases in pitch and decreases in pitch may be paired with a peak 310 while a bang or a crash or explosive sound effect may be paired with a bounce 312.

Figure 3C:
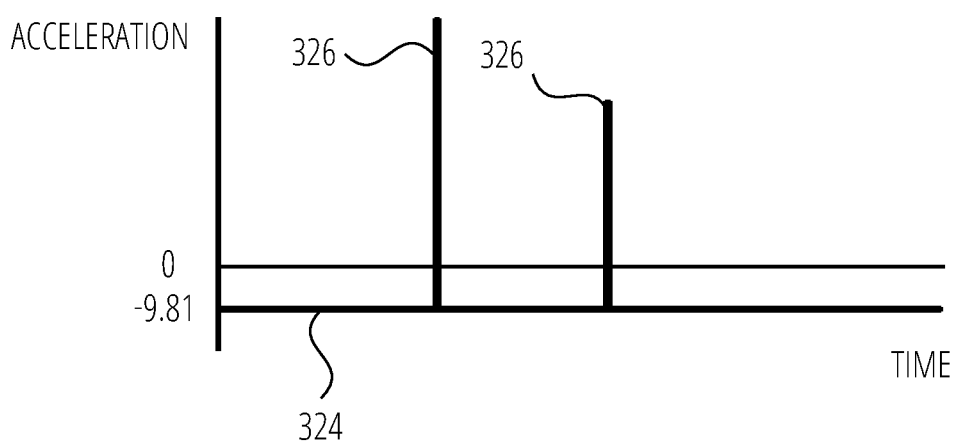
FIG. 3C is an example of a graph of acceleration versus time for a bouncing ball.

FIG. 3C is an example of a graph 306 of acceleration versus time corresponding to the graphs of FIG. 3A and FIG. 3B. As can be seen from the graph, the acceleration of the ball, being in free fall for most of the time, is at a constant negative one "g" acceleration 324 (ignoring air resistance) with positive acceleration spikes 326 corresponding to bounces 312. As before, the plot shown in FIG. 3A can be analyzed by the video analysis and editing system 214 to determine a characteristic frequency or period, or to detect events that might be paired with a sound effect or a soundtrack. For example, a spike in acceleration may be paired with a transient sound such as a bang or a crash or explosive sound effect.

Furthermore, information gleaned from FIG. 3A, FIG. 3B and FIG. 3C may be combined or used in conjunction to determine appropriate audio pairings, for example, a constant negative one "g" acceleration 324 in FIG. 3C with a zero crossing 316 in FIG. 3B would indicate a smooth transition representing a peak height.

Figure 4C:
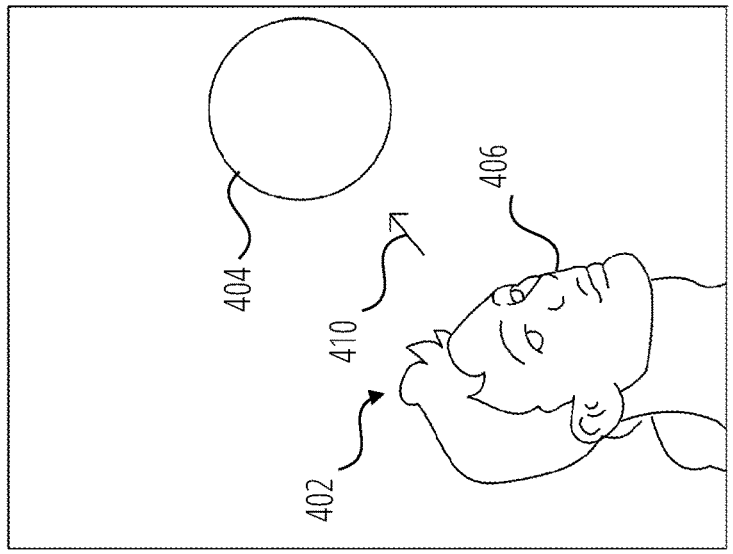
FIG. 4C is the third of three video frames illustrating a person heading a ball.
Figure 4B:
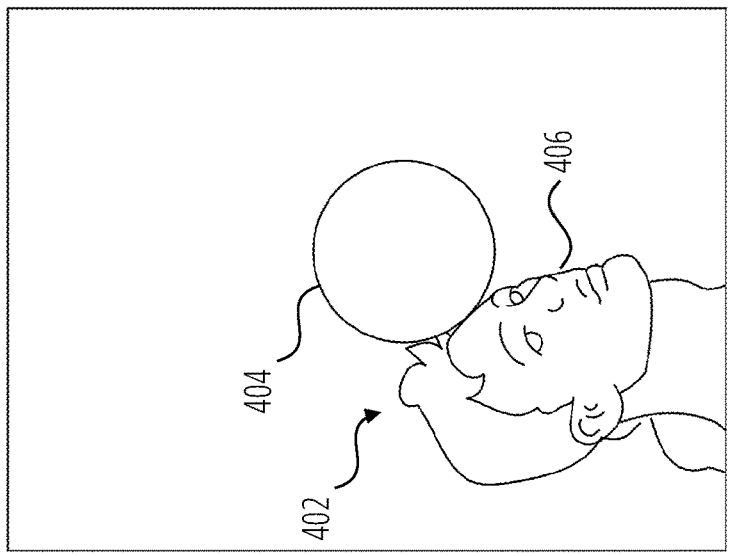
FIG. 4B is the second of three video frames illustrating a person heading a ball.
Figure 4A:
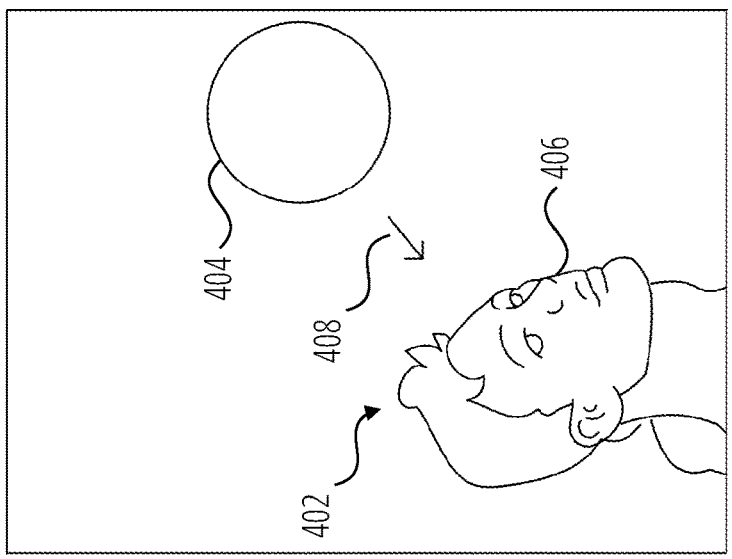
FIG. 4A is a first of three video frames illustrating a person heading a ball.

FIG. 4A, FIG. 4B and FIG. 4C are three video frames illustrating a person heading a ball. Shown in the frame illustrated in FIG. 4A are a person 402 with a head 406 and a ball 404 approaching the person's head 406 in the direction of arrow 408. These figures show one example of the type of interaction that might be supplemented by the addition of a sound effect by the video analysis and editing system 214. For example, the contact between the ball 404 and the person's head 406 may be supplemented by a relevant sound effect, for example an explosion, the firing of a gun or a "boing" spring sound or a vocal clip such as "What incredible skill!"

When analyzing the video, the video analysis and editing system 214 identifies objects that are candidates for identifying characteristics or events that might be paired with appropriate audio. Any computer vision object-detection and tracking methods may be used, for example based on objects being in motion, known recognizable objects such as balls or bats, body parts recognized using gesture recognition methods, and so forth. Objects such as faces may be identified using facial recognition techniques and so forth. In FIG. 4A, the video analysis and editing system 214 will for example recognize the face or head 406 of the person 402 and the ball 404.

Once an object has been recognized, its motion is analyzed to determine interactions with other objects, for example as discussed above with reference to FIG. 3A to FIG. 3C. As illustrated, the motion of the ball 404 will initially be towards the person 402 in FIG. 4A, will then momentarily come to a stop (relative to the person's head 406 in FIG. 4B), and will then move away from the person's head 406 as shown by arrow 410 in FIG. 4C. This change in motion can be detected as discussed above, and the video analysis and editing system 214 can then pair an appropriate sound with the change in direction. In this case, the interaction of the ball 404 with the person's head 406 is inferred from the motion of the ball rather than by explicitly determining an interaction of the ball 404 with the head 406.

In another example, the video analysis and editing system 214 can use objection collision detection techniques to determine that an interaction has occurred between two objects being tracked. For example, the video analysis and editing system 214 could detect that the boundaries of two tracked objects that did not intersect or overlap, or were in relative motion, now intersect or overlap. In FIG. 4B for example, the overlap or intersection of the person's head 406 and the ball 404 may be detected. The video analysis and editing system 214 can then pair an appropriate visual effect, sound, or sound effect with the detection of the intersection or overlap.

Additionally, or in the alternative, the video analysis and editing system 214 could change the speed of the video as the ball 404 approaches the person's head 406, for dramatic effect. For example, a section of the video clip starting shortly before the impact or change of direction of the ball and ending shortly after the impact or change of direction could be marked as a region in which the video is to be played back in slow motion. Other visual effects as described below may also be applied to the change of direction of the ball 404 as it contacts the person's head.

Figure 5:
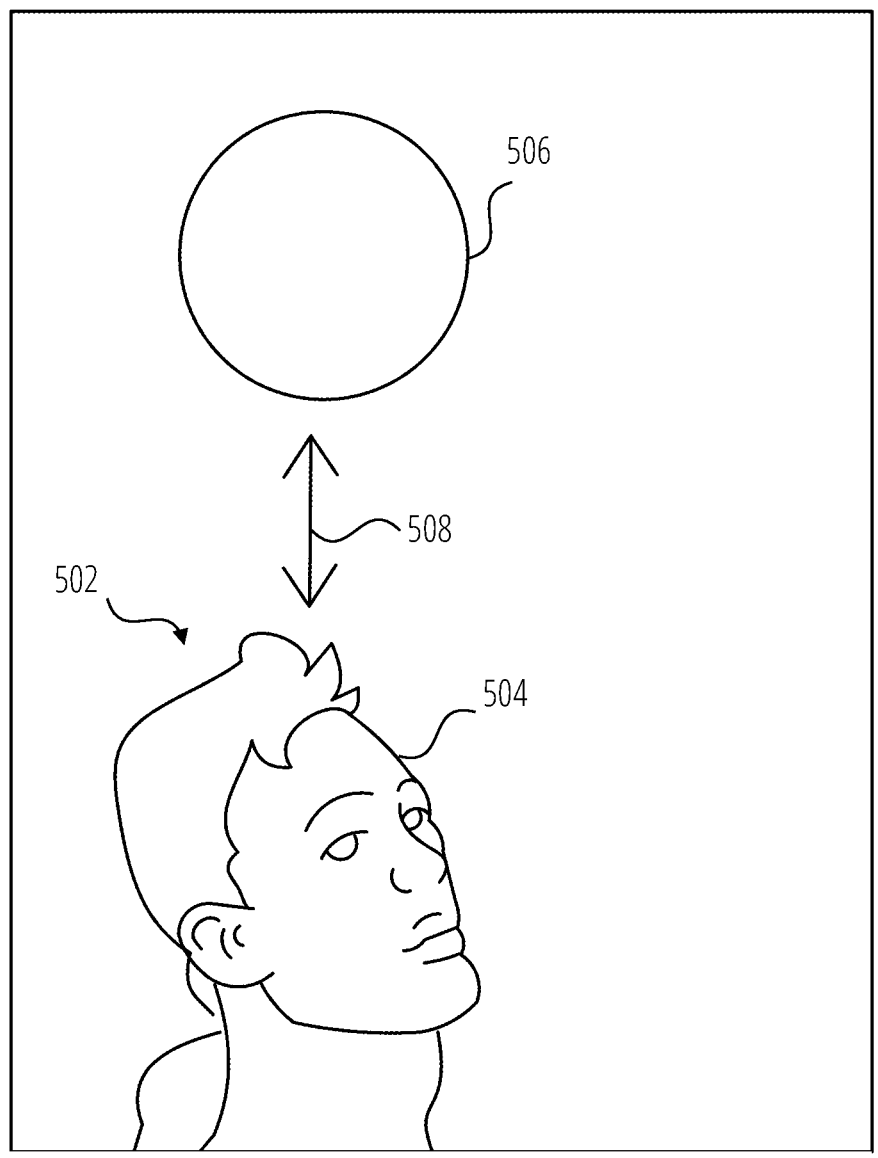
FIG. 5 is a frame from a video of a person juggling a ball on their head.

FIG. 5 is a frame from a video of a person 502 juggling a ball 506 on their head 504. In this example, the ball 506 bounces up and down repeatedly off the person's head 504 as shown by arrow 508. This figure shows one example of a type of repetitive motion that might be supplemented by the addition of a sound effect by the video analysis and editing system 214, or might benefit by the addition of a music track or excerpt. For example, the contact between the ball 506 and the person's head 504 may repeatedly be supplemented by a relevant sound effect each time the ball 506 makes contact with the user's head 504, for example an explosion, the firing of a gun or a "boing" spring sound or a vocal clip.

In another example, the motion of the ball could be paired with a sound that varies in pitch according to the height of the ball above the ground or above the head 504, for example a slide whistle sound effect that increases in pitch as the ball ascends and decreases in pitch as the ball descends. Additionally, the frequency at which the ball contact's the user's head 504 can be used to pair and synchronize the motion of the ball with an audio track having a corresponding or related number of beats per minute, such as a multiple or integer or fractional value of the motion of the ball. In the event that a perfect match is not available, the video analysis and editing system 214 may change the playback speed of one or both of the audio track or the video so that the motion of the ball matches the beats per minute of the audio track.

As before, when analyzing the video, the video analysis and editing system 214 will identify objects that are candidates for identifying characteristics or events that might be paired with appropriate audio. Any computer vision object-detection and tracking methods may be used, for example based on objects being in motion, known recognizable objects such as balls or bats, body parts recognized using gesture recognition methods, faces may be identified using facial recognition technology, and so forth. In FIG. 5, the video analysis and editing system 214 will for example recognize the face or head 504 of the person 502 and the ball 506.

Once an object has been recognized, its motion may be analyzed, for example as discussed above with reference to FIG. 3A to FIG. 3C. Similar to the bouncing ball discussed with reference to FIG. 3A to FIG. 3C, tracking of the motion of the ball will present a plot with peaks 310, bounces 312, zero crossings 316 and zero crossings 318 that can be used to characterize the motion of the ball and to provide events with sound effects or sound tracks can be paired or synchronized. Furthermore, the frequency of the motion of the ball can be extracted. The detected characteristics of the motion of the ball can then be used by the video analysis and editing system 214 to pair an appropriate sound with the change(s) in direction, with the height of the ball, or with the frequency of motion of the ball as discussed previously.

Also, as before, the video analysis and editing system 214 can use objection collision detection techniques to determine that an interaction has occurred between two objects being tracked. For example, the overlap or intersection of the person's head 504 and the ball 506 may be detected. The video analysis and editing system 214 can then pair an appropriate visual effect, sound or sound effect with the detection of the overlap or intersection.

Additionally or in the alternative, the video analysis and editing system 214 could include visual effects, for example a change of the speed of the video as the ball 506 approaches the person's head 504, for dramatic effect. For example, a section of the video clip starting shortly before the impact or change of direction of the ball and ending shortly after the impact or change of direction could be marked as a region in which the video is to be played back in slow motion, or the speed of playback could vary with the height or the inverse of the height of the ball 506 above the person's head 504. Other visual effects could also be applied, such as the insertion of AR effects or objects, the providing of image or media overlays or insertions into the video, varying the color and brightness, zooming in and out generally or on a feature of interest, e.g. the person's head 504 or the balls 404. An example of a video or image overlay might be a cartoon-style sound effect bubble such as POW! or WHAM! or BOOM! to coincide with the impact or change of direction of the ball 506 and any coincident sound effect, or the insertion of a momentary image of a famous soccer player.

The sound effects selected by the video analysis and editing system 214 may for example be based on popularity, may rotate between sound effects of the same general type (e.g. short and sharp sound effects for impacts or collisions), be determined from contextual information based on current time and date or location or event (e.g. based on the day or date, e.g. a fireworks sound on the 4th of July, a cannon sound if attending a civil war reenactment) or based on time, date, location, or keyword information in metadata accompanying the video. For example, it may be determined that a video was recorded in the vicinity of and at the approximate time of a concert (before, after, during) and therefore the band's newest single or other of their music may be selected to accompany the video.

Further, the user may be presented with a menu including options for audio and visual effects that can be indicated as preferred for use (Y), not to use (N), or maybe (M), maybe being the default. For example:

Sound effects: Boing Y/N/M; Bang Y/N/M; Crash Y/N/M; Meow Y/N/M; Bark Y/N/M

Visual effects: Change speed Y/N/<u>M</u>; Slo-mo Y/N/<u>M</u>; Super-fast Y/N/<u>M</u>, Zoom in/out Y/N/<u>M</u>

Figure 6:
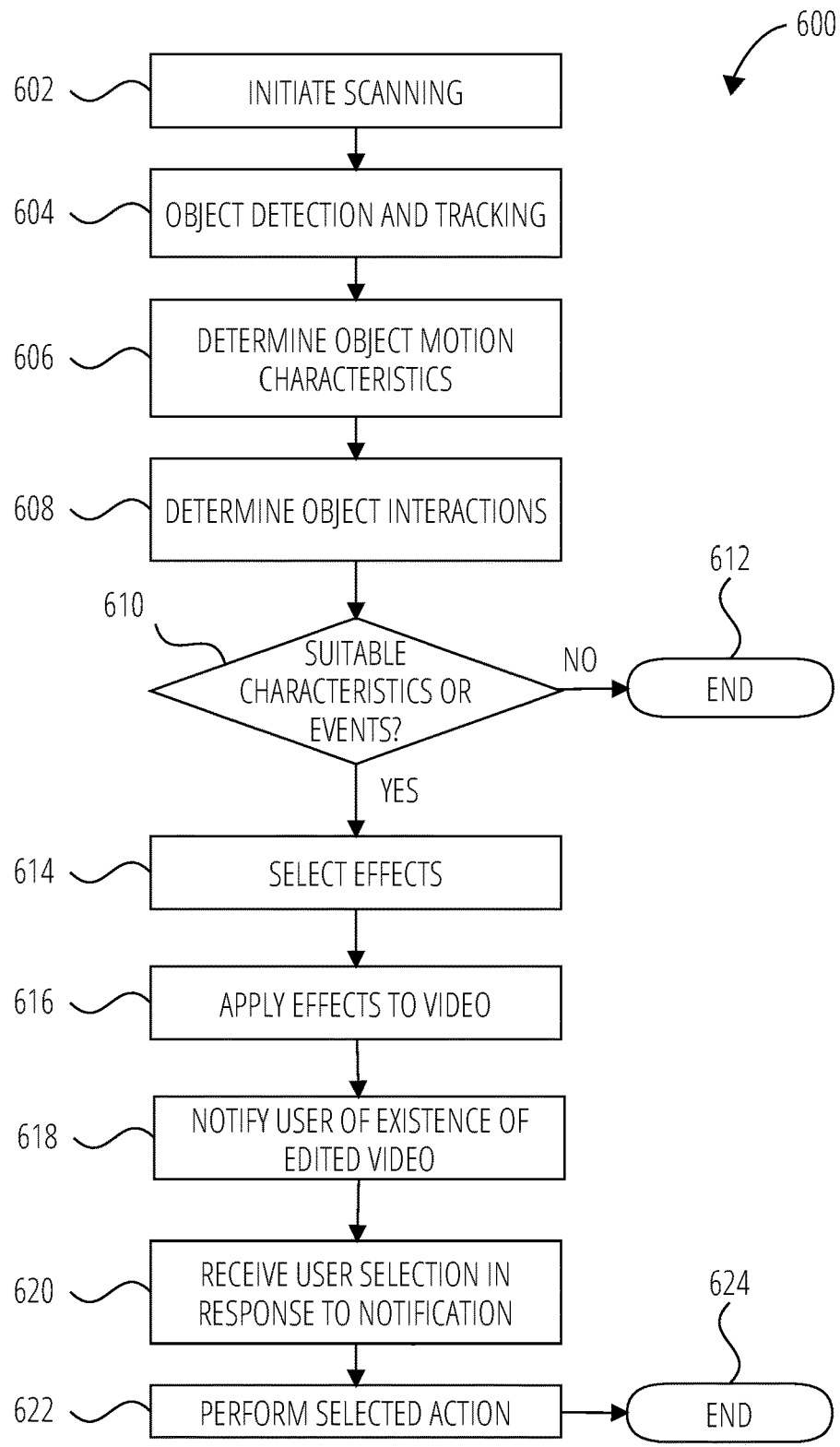
FIG. 6 is a flowchart showing video analysis and editing operations according to some examples.

FIG. 6 is a flowchart 600 showing video analysis and editing operations according to some examples. The operations illustrated in FIG. 6 will typically execute on client device 102 in an application such as messaging client 104, a video editing application, or a camera application provided with the messaging client 104. Various implementations are of course possible, with some of the operations taking place in application servers 114, or with one application calling another application or SDK for required functionality. In one example, the operations are performed jointly between the user interface 202 and video analysis and editing system 214 embodied in messaging client 104 running on client device 102. For the purposes of clarity, flowchart 600 is discussed herein with reference to such an example.

Prior to the commencement of the flowchart 600, the messaging client 104 is in a state in which a video is available for editing. For example, a user may have captured a video using a camera included in client device 102 or there may be videos that are currently stored in the client device's "camera roll" folder of stored videos and images.

The method starts at operation 602 with the messaging client 104 initiating the scanning of one or more videos by the video analysis and editing system 214 at operation 602. The scanning of videos may be triggered by detection of a newly created video (e.g. when a new video has been captured by a user using the messaging client 104 or using an operating system camera app included with the client device. Alternatively, the messaging client 104 could periodically scan the camera roll folder of the client device 102 to identify any videos that have been saved to the folder since the last time the messaging client 104 scanned for new videos. Furthermore, the scanning may be prompted by the messaging system 100 based on newly-available sound effects, promotions, or any other reason.

The video analysis and editing system 214 performs computer vision object-detection and tracking in operation 604 to identify and track objects of interest as discussed above with reference to FIGS. 3 and 4. Motion characteristics (e.g. position, displacement, velocity, acceleration, motion frequency and so forth) of tracked objects are then determined by the video analysis and editing system 214 in operation 606. The motion characteristics for the objects may be determined with reference to another object, the video frame, or the surroundings, as determined for example by simultaneous localization and mapping performed on the video by the video analysis and editing system 214.

Object interactions are then determined by the video analysis and editing system 214 for tracked objects in operation 608. The interaction between objects may for example be performed using object collision detection techniques or by inferring an interaction based on a change of direction, speed or other variation in the motion characteristics of a particular object as discussed above.

The video analysis and editing system 214 then determines at operation 610 whether any suitable events or motion characteristics have been detected in the video that is being scanned. For example, a video with little motion (e.g. of a person giving a speech) or few objects of interest that do not interact, may not be a good candidate for the addition of sound effects or other additional audio. The determination in operation 610 may be based on any characteristics determined from the video, for example overall object motion below a certain threshold, speed of motion below a certain threshold, the lack of detected interactions between objects, the lack of repetitive motion, no or slow changes of direction of tracked objects, and so forth. Suitable events or characteristics so identified are retained, with appropriate identifying and characterizing information, for further processing. The identifying and characterizing information may for example be the nature of the event (e.g. a collision, a rapid change in speed or direction), relevant motion characteristics (e.g. frequency of motion) and associated video timestamp information that can be used to synchronize the event with an appropriate sound effect or other audio. For example, a timestamp of the event or timestamps corresponding to repeated occurrences of the event that can be used for aligning the beat of a music track or to apply a sound effect repeatedly.

In the event that no or insufficient suitable characteristics or events are determined, the flowchart 600 terminates at operation 612.

In the event that a threshold number of suitable motion characteristics or events are determined in operation 610, the flowchart continues at operation 614, where editing effects are selected for motion characteristics or events based on the nature thereof as determined in operation 610. For example, a collision or rapid change in direction may be paired with an appropriate transient sound as discussed above, while a repetitive motion may be paired with a cyclical sound or an audio track having a matching number of beats per minute or fraction or multiple thereof.

In this regard, any audio or visual video editing effect may be paired with a detected event or characteristic, including changing or varying the speed of playback, inserting AR effects or objects, providing image or media overlays or insertions into the video, varying the color and brightness, zooming in and out generally or on a feature of interest, such as a person's face or a moving object that has been detected in the video, and so forth. In one example, a media overlay or insertion may be an image or video clip that overlays at least a portion of the video, or that is inserted as additional frame(s) into the video as such, at one or more times that may coincide with motion characteristics or events.

The video analysis and editing system 214 then applies the selected audio and visual effects to the video in operation 616. This will create a new version of the video having the effects applied thereto, which will be stored locally on client device 102 or remotely on the messaging server system 108 or one of the third-party servers 110. The application of the effects by the video analysis and editing system 214 will be synchronized to the relevant event or motion as described above.

The messaging client 104 then notifies the user of the existence of the edited video in operation 618, for example by providing a pop-up window or other notification on the display of the client device 102 via the user interface 202. The notification may be in the form of a prompt stating that an edited version of an existing video is available and asking if the user would like to view it, save it, edit it, discard it or provide a reminder at a later time. The notification may also be dismissed.

A selection by the user is then received by the messaging client 104 at operation 620 and the selected action is performed by messaging client 104 at operation 622. As discussed above, the selected action may be to view the edited video, save it, edit it, discard it or provide a reminder at a later time. Appropriate actions are taken in operation 622 and appropriate contexts are provided depending on the selected action. For example, if the user chooses to view the video, the video is displayed by the messaging client 104 on the client device 102 and conventional messaging client 104 user-selectable options are provided. For example, options may be provided to send the video in a message or chat session, post the video to a social network feed, save the video to the "camera roll" folder on the client device 102, or edit the video. In the event that the user chooses to dismiss the notification, the edited video may be deleted.

Upon completion of the selected action in operation 622, the flowchart 600 ends at operation 624. At this point the messaging client may return to a default user interface.

Figure 7:
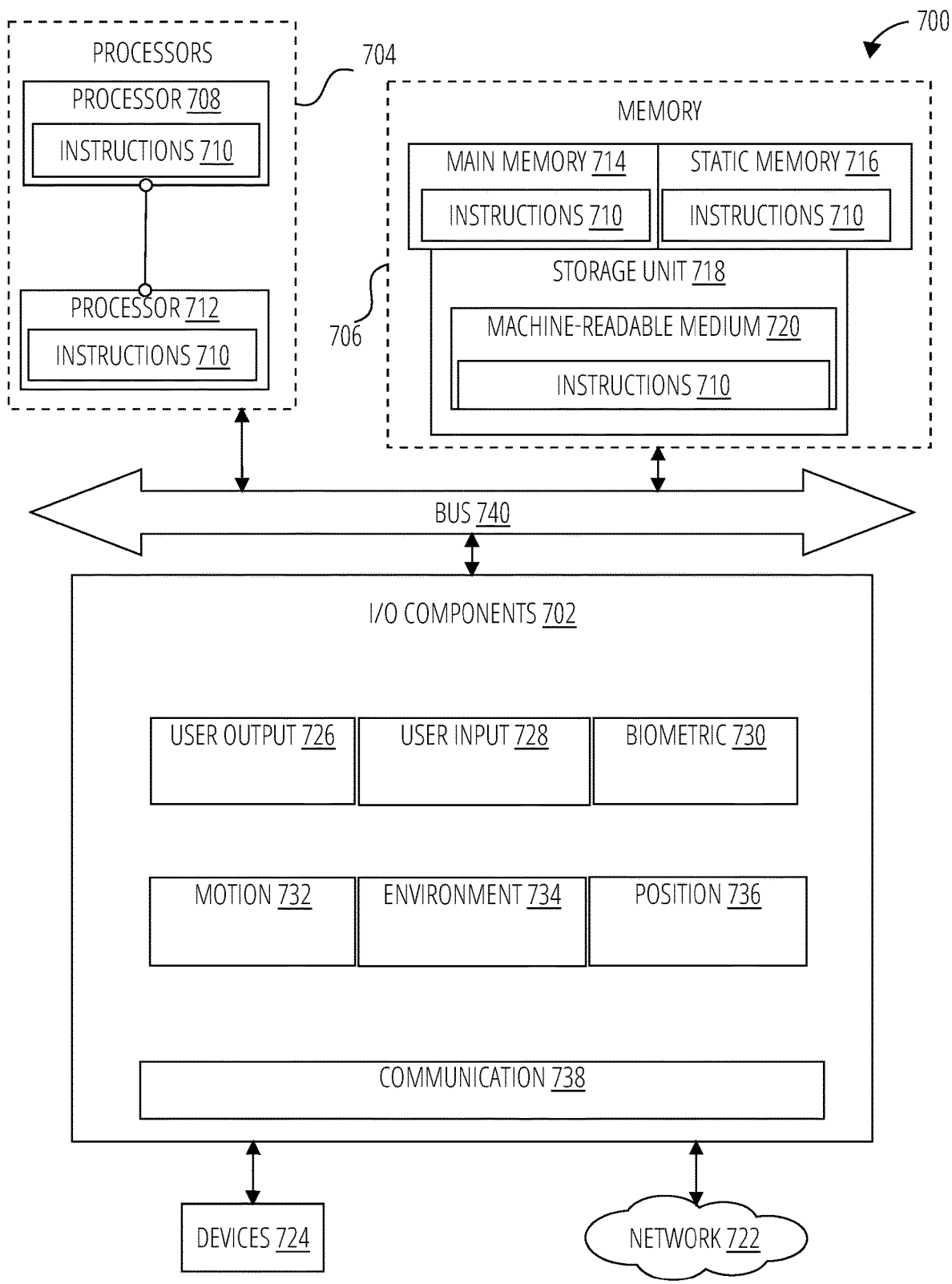
FIG. 7 is a diagrammatic representation of a machine in the form of a computer system within which a set of instructions may be executed for causing the machine to perform any one or more of the methodologies discussed herein, in accordance with some examples.

FIG. 7 is a diagrammatic representation of the machine 700 (e.g. client device 102) within which instructions 710 (e.g., software, a program, an application, an applet, an app, or other executable code) for causing the machine 700 to perform any one or more of the methodologies discussed herein may be executed. For example, the instructions 710 may cause the machine 700 to execute any one or more of the methods described herein. The instructions 710 transform the general, non-programmed machine 700 into a particular machine 700 programmed to carry out the described and illustrated functions in the manner described. The machine 700 may operate as a standalone device or may be coupled (e.g., networked) to other machines. In a networked deployment, the machine 700 may operate in the capacity of a server machine or a client machine in a server-client network environment, or as a peer machine in a peer-to-peer (or distributed) network environment. The machine 700 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smartphone, a mobile device, a wearable device (e.g., a smartwatch), a smart home device (e.g., a smart appliance), other smart devices, a web appliance, a network router, a network switch, a network bridge, or any machine capable of executing the instructions 710, sequentially or otherwise, that specify actions to be taken by the machine 700. Further, while only a single machine 700 is illustrated, the term "machine" shall also be taken to include a collection of machines that individually or jointly execute the instructions 710 to perform any one or more of the methodologies discussed herein. The machine 700, for example, may comprise the client device 102 or any one of a number of server devices forming part of the messaging server system 108. In some examples, the machine 700 may also comprise both client and server systems, with certain operations of a particular method or algorithm being performed on the server-side and with certain operations of the particular method or algorithm being performed on the client-side.

The machine 700 may include processors 704, memory 706, and input/output I/O components 702, which may be configured to communicate with each other via a bus 740. In an example, the processors 704 (e.g., a Central Processing Unit (CPU), a Reduced Instruction Set Computing (RISC) Processor, a Complex Instruction Set Computing (CISC) Processor, a Graphics Processing Unit (GPU), a Digital Signal Processor (DSP), an Application Specific Integrated Circuit (ASIC), a Radio-Frequency Integrated Circuit (RFIC), another processor, or any suitable combination thereof) may include, for example, a processor 708 and a processor 712 that execute the instructions 710. The term "processor" is intended to include multi-core processors that may comprise two or more independent processors (sometimes referred to as "cores") that may execute instructions contemporaneously. Although FIG. 7 shows multiple processors 704, the machine 700 may include a single processor with a single-core, a single processor with multiple cores (e.g., a multi-core processor), multiple processors with a single core, multiple processors with multiples cores, or any combination thereof.

The memory 706 includes a main memory 714, a static memory 716, and a storage unit 718, both accessible to the processors 704 via the bus 740. The main memory 706, the static memory 716, and storage unit 718 store the instructions 710 embodying any one or more of the methodologies or functions described herein. The instructions 710 may also reside, completely or partially, within the main memory 714, within the static memory 716, within machine-readable medium 720 within the storage unit 718, within at least one of the processors 704 (e.g., within the Processor's cache memory), or any suitable combination thereof, during execution thereof by the machine 700.

The I/O components 702 may include a wide variety of components to receive input, provide output, produce output, transmit information, exchange information, capture measurements, and so on. The specific I/O components 702 that are included in a particular machine will depend on the type of machine. For example, portable machines such as mobile phones may include a touch input device or other such input mechanisms, while a headless server machine will likely not include such a touch input device. It will be appreciated that the I/O components 702 may include many other components that are not shown in FIG. 7. In various examples, the I/O components 702 may include user output components 726 and user input components 728. The user output components 726 may include visual components (e.g., a display such as a plasma display panel (PDP), a light-emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The user input components 728 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and force of touches or touch gestures, or other tactile input components), audio input components (e.g., a microphone), and the like.

In further examples, the I/O components 702 may include biometric components 730, motion components 732, environmental components 734, or position components 736, among a wide array of other components. For example, the biometric components 730 include components to detect expressions (e.g., hand expressions, facial expressions, vocal expressions, body gestures, or eye-tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 732 include acceleration sensor components (e.g., accelerometer), gravitation sensor components, rotation sensor components (e.g., gyroscope).

The environmental components 734 include, for example, one or cameras (with still image/photograph and video capabilities), illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment.

With respect to cameras, the client device 102 may have a camera system comprising, for example, front cameras on a front surface of the client device 102 and rear cameras on a rear surface of the client device 102. The front cameras may, for example, be used to capture still images and video of a user of the client device 102 (e.g., "selfies"), which may then be augmented with augmentation data (e.g., filters) described above. The rear cameras may, for example, be used to capture still images and videos in a more traditional camera mode, with these images similarly being augmented with augmentation data. In addition to front and rear cameras, the client device 102 may also include a 360° camera for capturing 360° photographs and videos.

Further, the camera system of a client device 102 may include dual rear cameras (e.g., a primary camera as well as a depth-sensing camera), or even triple, quad or penta rear camera configurations on the front and rear sides of the client device 102. These multiple cameras systems may include a wide camera, an ultra-wide camera, a telephoto camera, a macro camera and a depth sensor, for example.

The position components 736 include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 702 further include communication components 738 operable to couple the machine 700 to a network 722 or devices 724 via respective coupling or connections. For example, the communication components 738 may include a network interface Component or another suitable device to interface with the network 722. In further examples, the communication components 738 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 724 may be another machine or any of a wide variety of peripheral devices (e.g., a peripheral device coupled via a USB).

Moreover, the communication components 738 may detect identifiers or include components operable to detect identifiers. For example, the communication components 738 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 738, such as location via Internet Protocol (IP) geolocation, location via Wi-Fi® signal triangulation, location via detecting an NFC beacon signal that may indicate a particular location, and so forth.

The various memories (e.g., main memory 714, static memory 716, and memory of the processors 704) and storage unit 718 may store one or more sets of instructions and data structures (e.g., software) embodying or used by any one or more of the methodologies or functions described herein. These instructions (e.g., the instructions 710), when executed by processors 704, cause various operations to implement the disclosed examples.

The instructions 710 may be transmitted or received over the network 722, using a transmission medium, via a network interface device (e.g., a network interface component included in the communication components 738) and using any one of several well-known transfer protocols (e.g., hypertext transfer protocol (HTTP)). Similarly, the instructions 710 may be transmitted or received using a transmission medium via a coupling (e.g., a peer-to-peer coupling) to the devices 724.

Figure 8:
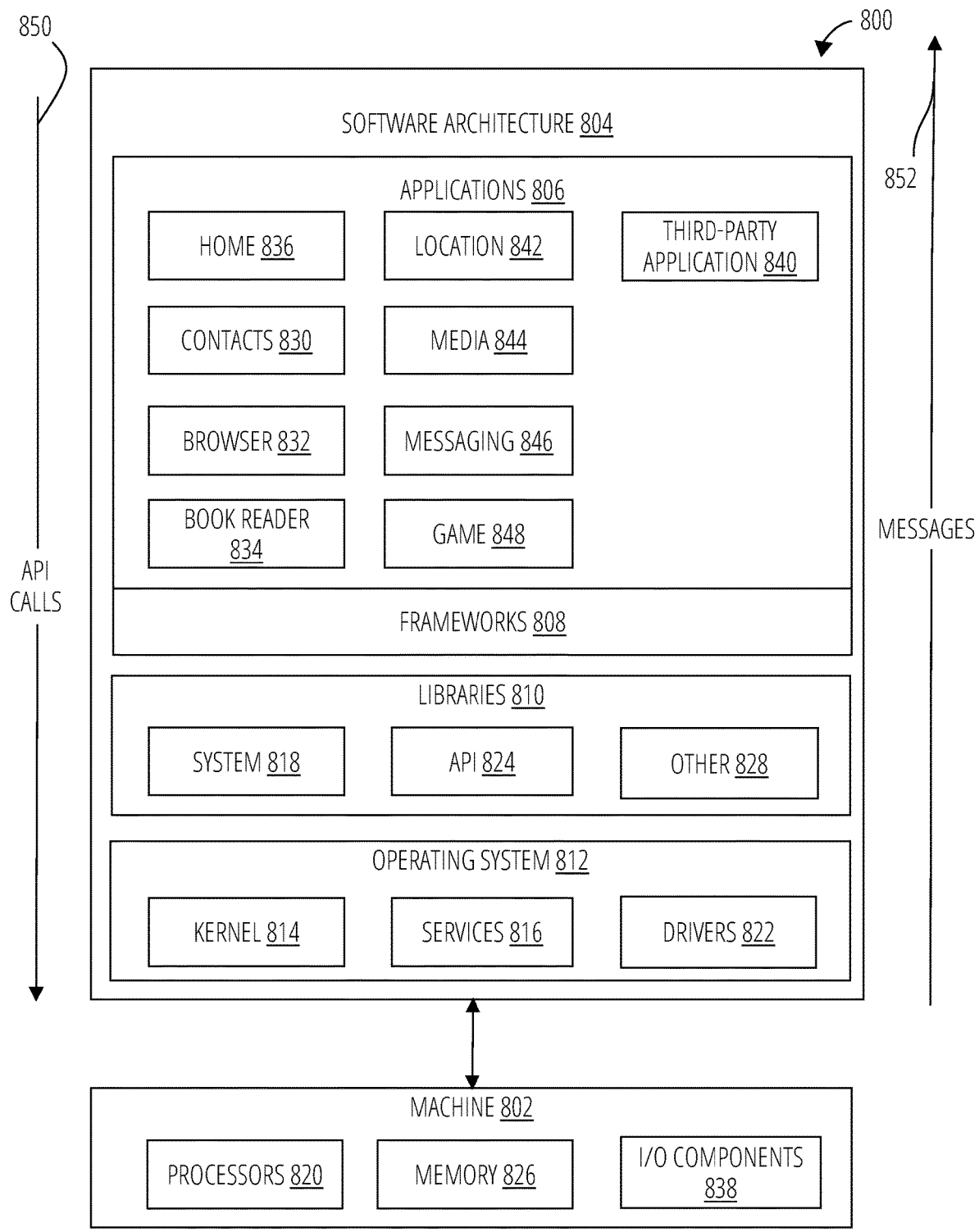
FIG. 8 is a block diagram showing a software architecture within which examples may be implemented.

FIG. 8 is a block diagram 800 illustrating a software architecture 804, which can be installed on any one or more of the devices described herein. The software architecture 804 is supported by hardware such as a machine 802 that includes processors 820, memory 826, and I/O components 838. In this example, the software architecture 804 can be conceptualized as a stack of layers, where each layer provides a particular functionality. The software architecture 804 includes layers such as an operating system 812, libraries 810, frameworks 808, and applications 806. Operationally, the applications 806 invoke API calls 850 through the software stack and receive messages 852 in response to the API calls 850.

The operating system 812 manages hardware resources and provides common services. The operating system 812 includes, for example, a kernel 814, services 816, and drivers 822. The kernel 814 acts as an abstraction layer between the hardware and the other software layers. For example, the kernel 814 provides memory management, processor management (e.g., scheduling), component management, networking, and security settings, among other functionality. The services 816 can provide other common services for the other software layers. The drivers 822 are responsible for controlling or interfacing with the underlying hardware. For instance, the drivers 822 can include display drivers, camera drivers, BLUETOOTH® or BLUETOOTH® Low Energy drivers, flash memory drivers, serial communication drivers (e.g., USB drivers), WI-FI® drivers, audio drivers, power management drivers, and so forth.

The libraries 810 provide a common low-level infrastructure used by the applications 806. The libraries 810 can include system libraries 818 (e.g., C standard library) that provide functions such as memory allocation functions, string manipulation functions, mathematic functions, and the like. In addition, the libraries 810 can include API libraries 824 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) in a graphic content on a display), database libraries (e.g., SQLite to provide various relational database functions), web libraries (e.g., WebKit to provide web browsing functionality), and the like. The libraries 810 can also include a wide variety of other libraries 828 to provide many other APIs to the applications 806.

The frameworks 808 provide a common high-level infrastructure that is used by the applications 806. For example, the frameworks 808 provide various graphical user interface (GUI) functions, high-level resource management, and high-level location services. The frameworks 808 can provide a broad spectrum of other APIs that can be used by the applications 806, some of which may be specific to a particular operating system or platform.

In an example, the applications 806 may include a home application 836, a contacts application 830, a browser application 832, a book reader application 834, a location application 842, a media application 844, a messaging application 846 (e.g. messaging client 104), a game application 848, and a broad assortment of other applications such as a third-party application 840. The applications 806 are programs that execute functions defined in the programs. Various programming languages can be employed to create one or more of the applications 806, structured in a variety of manners, such as object-oriented programming languages (e.g., Objective-C, Java, or C++) or procedural programming languages (e.g., C or assembly language). In a specific example, the third-party application 840 (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In this example, the third-party application 840 can invoke the API calls 850 provided by the operating system 812 to facilitate functionality described herein.

Glossary

"Carrier signal" refers to any intangible medium that is capable of storing, encoding, or carrying instructions for execution by the machine, and includes digital or analog communications signals or other intangible media to facilitate communication of such instructions. Instructions may be transmitted or received over a network using a transmission medium via a network interface device.

"Client device" refers to any machine that interfaces to a communications network to obtain resources from one or more server systems or other client devices. A client device may be, but is not limited to, a mobile phone, desktop computer, laptop, portable digital assistants (PDAs), smartphones, tablets, ultrabooks, netbooks, laptops, multi-processor systems, microprocessor-based or programmable consumer electronics, game consoles, set-top boxes, or any other communication device that a user may use to access a network.

"Communication network" refers to one or more portions of a network that may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network or a portion of a network may include a wireless or cellular network and the coupling may be a Code Division Multiple Access (CDMA) connection, a Global System for Mobile communications (GSM) connection, or other types of cellular or wireless coupling. In this example, the coupling may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long-range protocols, or other data transfer technology.

"Component" refers to a device, physical entity, or logic having boundaries defined by function or subroutine calls, branch points, APIs, or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components. A "hardware component" is a tangible unit capable of performing certain operations and may be configured or arranged in a certain physical manner. In various examples, one or more computer systems (e.g., a standalone computer system, a client computer system, or a server computer system) or one or more hardware components of a computer system (e.g., a processor or a group of processors) may be configured by software (e.g., an application or application portion) as a hardware component that operates to perform certain operations as described herein. A hardware component may also be implemented mechanically, electronically, or any suitable combination thereof. For example, a hardware component may include dedicated circuitry or logic that is permanently configured to perform certain operations. A hardware component may be a special-purpose processor, such as a field-programmable gate array (FPGA) or an application specific integrated circuit (ASIC). A hardware component may also include programmable logic or circuitry that is temporarily configured by software to perform certain operations. For example, a hardware component may include software executed by a general-purpose processor or other programmable processor. Once configured by such software, hardware components become specific machines (or specific components of a machine) uniquely tailored to perform the configured functions and are no longer general-purpose processors. It will be appreciated that the decision to implement a hardware component mechanically, in dedicated and permanently configured circuitry, or in temporarily configured circuitry (e.g., configured by software), may be driven by cost and time considerations. Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein. Considering examples in which hardware components are temporarily configured (e.g., programmed), each of the hardware components need not be configured or instantiated at any one instance in time. For example, where a hardware component comprises a general-purpose processor configured by software to become a special-purpose processor, the general-purpose processor may be configured as respectively different special-purpose processors (e.g., comprising different hardware components) at different times. Software accordingly configures a particular processor or processors, for example, to constitute a particular hardware component at one instance of time and to constitute a different hardware component at a different instance of time. Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In examples in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information). The various operations of example methods described herein may be performed, at least partially, by one or more processors that are temporarily configured (e.g., by software) or permanently configured to perform the relevant operations. Whether temporarily or permanently configured, such processors may constitute processor-implemented components that operate to perform one or more operations or functions described herein. As used herein, "processor-implemented component" refers to a hardware component implemented using one or more processors. Similarly, the methods described herein may be at least partially processor-implemented, with a particular processor or processors being an example of hardware. For example, at least some of the operations of a method may be performed by one or more processors 704 or processor-implemented components. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an API). The performance of certain of the operations may be distributed among the processors, not only residing within a single machine, but deployed across a number of machines. In some examples, the processors or processor-implemented components may be located in a single geographic location (e.g., within a home environment, an office environment, or a server farm). In other examples, the processors or processor-implemented components may be distributed across a number of geographic locations.

"Computer-readable storage medium" refers to both machine-storage media and transmission media. Thus, the terms include both storage devices/media and carrier waves/modulated data signals. The terms "machine-readable medium," "computer-readable medium" and "device-readable medium" mean the same thing and may be used interchangeably in this disclosure.

"Ephemeral message" refers to a message that is accessible for a time-limited duration. An ephemeral message may be a text, an image, a video and the like. The access time for the ephemeral message may be set by the message sender. Alternatively, the access time may be a default setting or a setting specified by the recipient. Regardless of the setting technique, the message is transitory.

"Machine storage medium" refers to a single or multiple storage devices and media (e.g., a centralized or distributed database, and associated caches and servers) that store executable instructions, routines and data. The term shall accordingly be taken to include, but not be limited to, solid-state memories, and optical and magnetic media, including memory internal or external to processors. Specific examples of machine-storage media, computer-storage media and device-storage media include non-volatile memory, including by way of example semiconductor memory devices, e.g., erasable programmable read-only memory (EPROM), electrically erasable programmable read-only memory (EEPROM), FPGA, and flash memory devices; magnetic disks such as internal hard disks and removable disks; magneto-optical disks; and CD-ROM and DVD-ROM disks The terms "machine-storage medium," "device-storage medium," "computer-storage medium" mean the same thing and may be used interchangeably in this disclosure. The terms "machine-storage media," "computer-storage media," and "device-storage media" specifically exclude carrier waves, modulated data signals, and other such media, at least some of which are covered under the term "signal medium."

"Non-transitory computer-readable storage medium" refers to a tangible medium that is capable of storing, encoding, or carrying the instructions for execution by a machine.

"Signal medium" refers to any intangible medium that is capable of storing, encoding, or carrying the instructions for execution by a machine and includes digital or analog communications signals or other intangible media to facilitate communication of software or data. The term "signal medium" shall be taken to include any form of a modulated data signal, carrier wave, and so forth. The term "modulated data signal" means a signal that has one or more of its characteristics set or changed in such a matter as to encode information in the signal. The terms "transmission medium" and "signal medium" mean the same thing and may be used interchangeably in this disclosure.

What is claimed is:

1. A method, executed by one or more processors, for generation of a modified video file for presentation on a device including a display, comprising:
   initiating scanning of an original video file;
   detecting objects represented in the original video file using computer vision object-detection techniques;
   determining object motion characteristics for the detected objects;
   based on the object motion characteristics not meeting a suitability criterion, terminating the method;
   based on the object motion characteristics meeting a suitability criterion, performing the following steps;
   based on a specific object motion characteristic for a specific detected object meeting a predetermined requirement, selecting a relevant audio or visual effect;
   applying the relevant audio or visual effect to the original video file to create the modified video file; and
   providing a notification of the existence of the modified video file on the display of the device.

2. The method of claim 1 wherein the predetermined requirement for the specific object motion characteristic is a change in direction of the specific detected object.

3. The method of claim 2 wherein the relevant audio or visual effect is a sound effect applied to correspond to the change in direction of the specific detected object.

4. The method of claim 1 wherein the predetermined requirement for the specific object motion characteristic is repeating motion of the specific detected object.

5. The method of claim 4 wherein the relevant audio or visual effect is a sound effect that is applied repetitively at a frequency of motion of the specific detected object.

6. The method of claim 4 wherein the relevant audio or visual effect is an audio track that has a characteristic frequency that is substantially a multiple or fractional value of a frequency of motion of the specific detected object.

7. The method of claim 1, wherein the suitability criterion is a threshold number of motion characteristics that meet the predetermined requirement.

8. The method of claim 7 wherein the predetermined requirement for the motion characteristics is a speed of motion of the specific detected object.

9. The method of claim 1 wherein the predetermined requirement for the specific object motion characteristic is a collision of the specific detected object with another object.

10. A non-transitory computer-readable storage medium, the computer-readable storage medium including instructions that when executed by a computer, cause the computer to perform operations to generate a modified video file, the operations comprising:
   initiating scanning of an original video file;
   detecting objects represented in the original video file using computer vision object-detection techniques;
   determining object motion characteristics for the detected objects;
   based on the object motion characteristics not meeting a suitability criterion, terminating the method;
   based on the object motion characteristics meeting a suitability criterion, performing the following steps;
   based on a specific object motion characteristic for a specific detected object meeting a predetermined requirement, selecting a relevant audio or visual effect;
   applying the relevant audio or visual effect to the original video file to create the modified video file; and
   providing a notification of the existence of the modified video file on a display.

11. The computer-readable storage medium of claim 10 wherein the relevant audio or visual effect is a sound effect applied to correspond to a change in direction of the specific detected object.

12. The computer-readable storage medium of claim 10 wherein the predetermined requirement for the specific object motion characteristic is repeating motion of the specific detected object.

13. The computer-readable storage medium of claim 12 wherein the relevant audio or visual effect is a sound effect that is applied repetitively at a frequency of motion of the specific detected object.

14. The computer-readable storage medium of claim 12 wherein the suitability criterion is a threshold number of motion characteristics that meet the predetermined requirement.

15. A computing apparatus comprising:
   a processor; and
   a memory storing instructions that, when executed by the processor, configure the apparatus to generate a modified video file by:
   initiating scanning of an original video file;
   detecting objects represented in the original video file using computer vision object-detection techniques;
   determining object motion characteristics for the detected objects;
   based on the object motion characteristics not meeting a suitability criterion, terminating the method;
   based on the object motion characteristics meeting a suitability criterion, performing the following steps;
   based on a specific object motion characteristic for a specific detected object meeting a predetermined requirement, selecting a relevant audio or visual effect;
   applying the relevant audio or visual effect to the original video file to create the modified video file; and
   providing a notification of the existence of the modified video file on a display.

16. The computing apparatus of claim 15 wherein the predetermined requirement for the specific object motion characteristic is a change in direction of the specific detected object.

17. The computing apparatus of claim 15 wherein the predetermined requirement for the specific object motion characteristic is a collision of the specific detected object with another object.

18. The computing apparatus of claim 15 wherein the predetermined requirement for the specific object motion characteristic is a frequency of motion of the specific detected object.

19. The computing apparatus of claim 15 wherein the suitability criterion is a threshold number of motion characteristics that meet the predetermined requirement.

20. The computing apparatus of claim 19 wherein the predetermined requirement for the motion characteristics is a speed of motion of the specific detected object.

* * * * *